United States Patent
Enomoto

(10) Patent No.: US 11,011,798 B2
(45) Date of Patent: May 18, 2021

(54) ENERGY STORAGE DEVICE

(71) Applicant: GS Yuasa International Ltd., Kyoto (JP)

(72) Inventor: Yukio Enomoto, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 118 days.

(21) Appl. No.: 16/311,609

(22) PCT Filed: Jun. 23, 2017

(86) PCT No.: PCT/JP2017/023141
§ 371 (c)(1),
(2) Date: Dec. 19, 2018

(87) PCT Pub. No.: WO2017/222039
PCT Pub. Date: Dec. 28, 2017

(65) Prior Publication Data
US 2019/0326581 A1    Oct. 24, 2019

(30) Foreign Application Priority Data
Jun. 24, 2016 (JP) .............................. JP2016-125518

(51) Int. Cl.
| | |
|---|---|
| *H01M 2/18* | (2006.01) |
| *H01M 2/34* | (2006.01) |
| *H01M 10/058* | (2010.01) |
| *H01G 11/26* | (2013.01) |
| *H01G 11/78* | (2013.01) |
| *H01M 50/463* | (2021.01) |

(52) U.S. Cl.
CPC .......... *H01M 50/463* (2021.01); *H01G 11/26* (2013.01); *H01G 11/78* (2013.01)

(58) Field of Classification Search
CPC .......... H01M 2/18; H01M 2/34; H01M 10/04; H01M 10/058; H01G 11/26; H01G 11/78
See application file for complete search history.

(56) References Cited

U.S. PATENT DOCUMENTS

| | | | |
|---|---|---|---|
| 10,074,831 B2 | 9/2018 | Tsuruta et al. | |
| 2011/0195299 A1* | 8/2011 | Hashimoto | H01M 10/0413 429/153 |

FOREIGN PATENT DOCUMENTS

| | | |
|---|---|---|
| CN | 103258983 A | 8/2013 |
| JP | 2003-323874 A | 11/2003 |
| JP | 2004-014395 A | 1/2004 |
| JP | 2010-073580 A | 4/2010 |

(Continued)

OTHER PUBLICATIONS

International Search Report (ISR) (PCT Form PCT/ISA/210), in PCT/JP2017/023141, dated Aug. 15, 2017.

*Primary Examiner* — Brittany L Raymond
(74) *Attorney, Agent, or Firm* — McGinn I.P. Law Group, PLLC

(57) ABSTRACT

An energy storage device includes: an electrode assembly; a case for accommodating the electrode assembly; a spacer interposed between the case and the electrode assembly; and a strip-like member being brought into contact with each of a side surface of the spacer and a side surface of the electrode assembly and fixing the spacer and the electrode assembly to each other. A portion of the spacer with which the strip-like member is brought into contact is wholly formed of a recessed portion.

20 Claims, 8 Drawing Sheets

(56) References Cited

FOREIGN PATENT DOCUMENTS

| | | |
|---|---|---|
| JP | 2011-049066 A | 3/2011 |
| JP | WO2010/113272 A1 | 10/2012 |
| JP | 2014-033736 A | 2/2014 |
| JP | 2014-078447 A | 5/2014 |
| JP | 2015-146252 A | 8/2015 |

* cited by examiner

ENERGY STORAGE DEVICE

TECHNICAL FIELD

The present invention relates to an energy storage device.

BACKGROUND ART

Conventionally, as energy storage devices, there has been known an energy storage device where an electrode assembly is housed in a case with a spacer interposed between the electrode assembly and the case, and the electrode assembly and the spacer are integrated to each other by a tape member (see Patent Document 1).

PRIOR ART DOCUMENT

Patent Document

Patent Document 1: JP-A-2010-73580

SUMMARY OF THE INVENTION

Problems to be Solved by the Invention

In such a configuration, even when the electrode assembly and the spacer are simply fixed to each other by the tape member, there is a possibility that the tape member is removed (peeled off) so that the electrode assembly is lowered from a predetermined position due to its own weight thus causing the positional displacement of the electrode assembly. Further, the tape is adhered to the spacer and hence, the tape protrudes from a surface of the spacer. Accordingly, a mounting space for the electrode assembly in the case becomes narrow.

Thus, an object of the present invention is to suppress the positional displacement of an electrode assembly, and to ensure a mounting space for the electrode assembly in a case.

Means for Solving the Problems

To achieve the above-mentioned object, an energy storage device according to an aspect of the present invention includes: an electrode assembly; a case for accommodating the electrode assembly; a spacer interposed between the case and the electrode assembly; and a strip-like member being brought into contact with each of the spacer and the electrode assembly and fixing the spacer and the electrode assembly to each other, wherein a portion of the spacer with which the strip-like member is brought into contact is wholly formed of a recessed portion.

Advantages of the Invention

According to the present invention, the positional displacement of the electrode assembly can be suppressed, and a mounting space for the electrode assembly in the case can be ensured.

MODE FOR CARRYING OUT THE INVENTION

Figure 1:
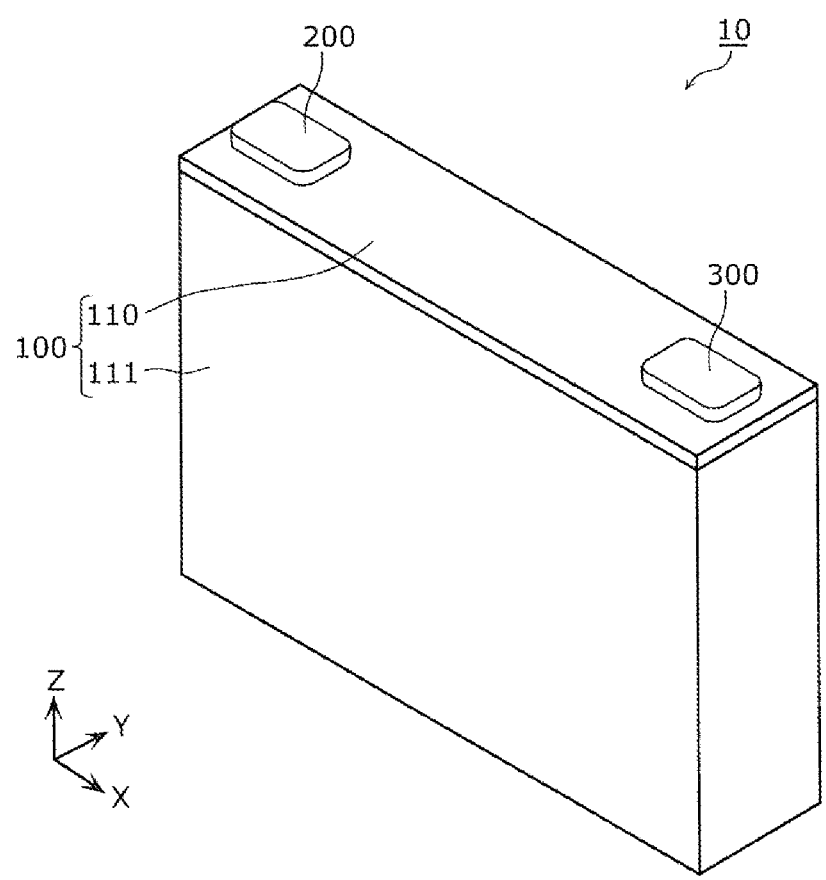
FIG. 1 is a perspective view showing an external appearance of an energy storage device according to an embodiment.

To achieve the above-mentioned object, an energy storage device according to an aspect of the present invention includes: an electrode assembly; a case for accommodating the electrode assembly; a spacer interposed between the case and the electrode assembly; and a strip-like member being brought into contact with each of the spacer and the electrode assembly and fixing the spacer and the electrode assembly to each other, wherein a portion of the spacer with which the strip-like member is brought into contact is wholly formed of a recessed portion.

With such a configuration, the portion of the spacer with which the strip-like member is brought into contact is wholly formed of the recessed portion and hence, the strip-like member is caught by the recessed portion. As a result, the displacement of the strip-like member from the spacer can be suppressed so that the positional displacement between the electrode assembly and the spacer can be also suppressed. Accordingly, it is possible to suppress lowering of the electrode assembly from a predetermined position due to its own weight.

Further, the portion of the spacer with which the strip-like member is brought into contact is wholly formed of the recessed portion and hence, a protruding amount of the whole strip-like member with respect to the spacer can be suppressed. Accordingly, a mounting space for the electrode assembly in the case can be increased.

In this manner, the positional displacement of the electrode assembly can be suppressed, and a mounting space for the electrode assembly in the case can be ensured.

A plurality of the strip-like members may be provided, and a plurality of the recessed portions may be formed on the spacer corresponding to the plurality of the strip-like members.

With such a configuration, the plurality of strip-like members are formed and hence, it is possible to prevent the removal of the strip-like members from the spacer. Further, the spacer has the plurality of catching portions (recessed portions) with respect to the strip-like member and hence, it is possible to suppress lowering of the electrode assembly from a predetermined position due to its own weight with certainty.

The strip-like member may be a tape member having adhesiveness.

With such a configuration, the strip-like member is formed of a tape member and hence, the spacer and the electrode assembly can be easily fixed to each other. Further, even when the strip-like member is peeled off from the spacer, the strip-like member can be caught by the recessed portion.

The recessed portion may have a shape corresponding to a portion of the strip-like member which is brought into contact with the spacer.

With such a configuration, the recessed portion has a shape corresponding to the portion of the strip-like member which is brought into contact with the spacer and hence, the strip-like member can be fitted into the recessed portion. Accordingly, the positional displacement of the strip-like member is less likely to occur.

The spacer may be an integral body which is continuously brought into contact with, over the entire length of, one side portion of the electrode assembly extending in a direction that the electrode assembly is inserted into the case.

With such a configuration, the spacer which is the integral body is continuously brought into contact with one side portion of the electrode assembly over the entire length and hence, the spacer protects the electrode assembly during a period from inserting the electrode assembly into the case to finishing the insertion of the electrode assembly. Accordingly, a force which acts on the electrode assembly at the time of insertion can be decreased thus enhancing durability of the electrode assembly.

The spacer is continuously brought into contact with one side portion of the electrode assembly over the entire length and hence, a close contact property between the spacer and the electrode assembly can be enhanced whereby the positional displacement between the electrode assembly and the spacer can be further suppressed.

The spacer may be directly fixed to the electrode assembly.

With such a configuration, the spacer is directly fixed to the electrode assembly and hence, no other member is interposed between the spacer and the electrode assembly. That is, close contact property between the spacer and the electrode assembly can be enhanced and hence, the positional displacement between the electrode assembly and the spacer can be further suppressed.

Hereinafter, an energy storage device according to an embodiment of the present invention is described with reference to drawings. The respective drawings are schematic views, and in the respective drawings, constitutional elements are not always described strictly accurately in size or the like.

Further, the embodiment described hereinafter shows one specific example of the present invention. In the embodiment described hereinafter, shapes, materials, constitutional elements, the arrangement positions and connection states of the constitutional elements, the order of manufacturing steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

First, the overall configuration of an energy storage device 10 according to an embodiment is described with reference to FIG. 1 and FIG. 2.

FIG. 1 is a perspective view showing an external appearance of the energy storage device 10 according to the embodiment. FIG. 2 is an exploded perspective view of the energy storage device 10 according to the embodiment.

In FIG. 1 and the drawings succeeding to FIG. 1, for the sake of convenience of the description, the description is made by assuming that a Z axis direction is the vertical direction. However, there may be also a case where the Z axis direction does not agree with the vertical direction in an actual use state of the energy storage device.

The energy storage device 10 is a secondary battery which can charge electricity and discharge electricity. To be more specific, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV) or the like. The energy storage device 10 is not limited to a nonaqueous electrolyte secondary battery, and may be a secondary battery other than a nonaqueous electrolyte secondary battery, or may be a capacitor. A shape of the energy storage device 10 is not limited to a rectangular shape, and the energy storage device 10 may have other shapes such as a circular cylindrical shape, for example. Further, the energy storage device 10 may be a primary battery.

Figure 2:
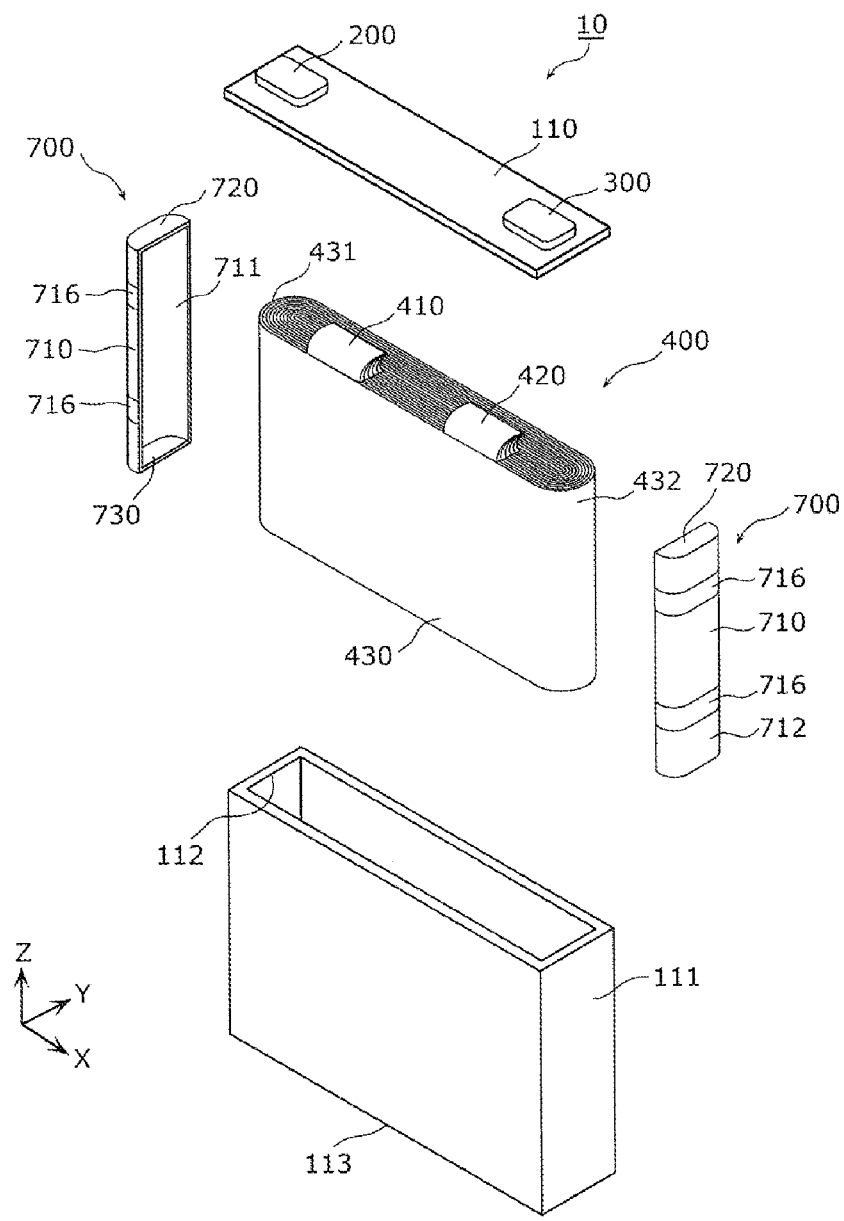
FIG. 2 is an exploded perspective view of the energy storage device according to the embodiment.

As shown in FIG. 1 and FIG. 2, the energy storage device 10 includes: a case 100; a positive electrode terminal 200; a negative electrode terminal 300; an electrode assembly 400; and side spacers 700. Although not shown in the drawing, the energy storage device 10 includes: a positive electrode current collector which electrically connects a positive pole of the electrode assembly 400 and the positive electrode terminal 200 to each other; and a negative electrode current collector which electrically connects a negative pole of the electrode assembly 400 and the negative electrode terminal 300 to each other besides the above-mentioned constitutional elements. Although a liquid such as an electrolyte solution (nonaqueous electrolyte) is sealed in the case 100 of the energy storage device 10, the illustration of the liquid is omitted. As an electrolyte solution sealed in the case 100, a kind of the electrolyte solution is not particularly limited, and various kinds of electrolyte solution can be selected provided that performance of the energy storage device 10 is not impaired.

The case 100 is a rectangular-shaped case, and includes a body 111, and a lid body 110. Although a material for forming the body 111 and a material for forming the lid body 110 are not particularly limited, for example, it is preferable that the body 111 and the lid body 110 be made of weldable metal such as stainless steel, aluminum, or an aluminum alloy, for example.

The body 111 is formed of a cylindrical body having a rectangular shape as viewed in a top plan view, and has an opening 112 on one end portion thereof and a bottom 113 on the other end portion thereof. In assembling the energy storage device 10, the electrode assembly 400, the side spacers 700 and the like are inserted into the body 111 of the case 100 through the opening 112. A direction that the electrode assembly 400, the side spacers 700 and the like are inserted through the opening 112 is assumed as an insertion direction (Z axis direction). The inside of the body 111 is hermetically sealed by joining the lid body 110 to the body 111 by welding or the like after the electrode assembly 400 and the like are accommodated in the inside of the body 111.

The lid body 110 is a plate-like member which closes the opening 112 of the body 111. Although not shown in the drawings, a gas release valve and an electrolyte solution filling port are formed in the lid body 110. The gas release valve is configured to discharge a gas in the case 100 by being opened when an internal pressure of the case 100 is increased. The electrolyte solution filling port is an opening for filling an electrolyte solution into the case 100.

The electrode assembly 400 includes: a positive electrode plate; a negative electrode plate; and a separator, and is a member for storing electricity. The detailed configuration of the electrode assembly 400 is described later with reference to FIG. 3 and the like.

The positive electrode terminal 200 is an electrode terminal which is electrically connected to a tab bundle 410 on a positive electrode side of the electrode assembly 400 via the positive electrode current collector. The negative electrode terminal 300 is an electrode terminal which is electrically connected to a tab bundle 420 on a negative electrode side of the electrode assembly 400 via the negative electrode current collector. That is, the positive electrode terminal 200 and the negative electrode terminal 300 are electrode terminals made of metal or the like having conductivity through which electricity stored in the electrode assembly 400 is discharged to a space outside the energy storage device 10, and through which electricity is introduced into a space in the energy storage device 10 for storing the electricity in the electrode assembly 400. Further, the positive electrode terminal 200 and the negative electrode terminal 300 are mounted on the lid body 110 disposed above the electrode assembly 400 with a gasket (not shown in the drawing) having insulation property interposed between the positive electrode terminal 200 and the negative electrode terminal 300 and the lid body 110.

In this embodiment, the side spacer 700 is disposed between side surfaces (in this embodiment, both side surfaces in the X axis direction) of the electrode assembly 400 in a direction orthogonal to a direction that the electrode assembly 400 and the lid body 110 are arranged (Z axis direction) and an inner peripheral surface of the case 100. The side spacers 700 play a role of restricting the position of the electrode assembly 400, for example. The side spacers 700 are disposed between the electrode assembly 400 and the case 100, and function as guide members at the time of inserting the electrode assembly 400 into the case 100. Further, the side spacers 700 have the higher rigidity than insulation members such as separators 470a, 470b (see FIG. 3) provided to the electrode assembly 400. For example, the side spacers 700 are made of a raw material having insulation property such as polycarbonate (PC), polypropylene (PP), polyethylene (PE), or a polyphenylene sulfide resin (PPS).

Next, the configuration of the electrode assembly 400 is described with reference to FIG. 3.

Figure 3:
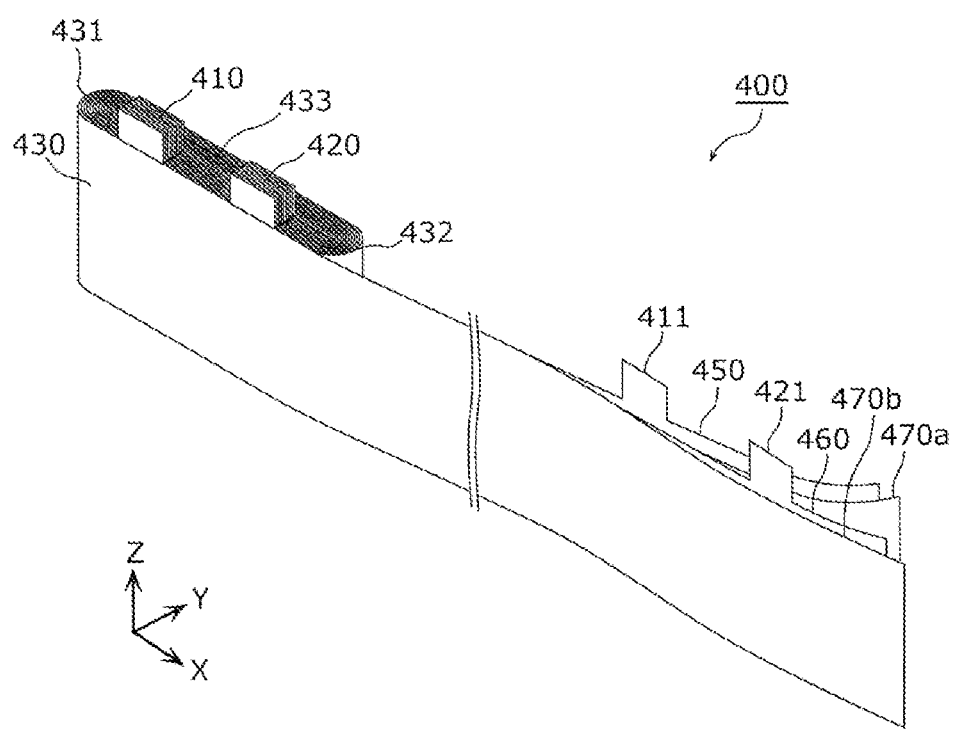
FIG. 3 is a perspective view showing a configuration of the electrode assembly according to the embodiment.

FIG. 3 is a perspective view showing the configuration of the electrode assembly 400 according to the embodiment. FIG. 3 shows a winding state of the electrode assembly 400 in a partially developed manner.

The electrode assembly 400 is an energy storage element (power generating element) which can store electricity. The electrode assembly 400 is formed by alternately stacking and winding the positive electrode 450, the negative electrode 460, and the separators 470a, 470b. That is, the electrode assembly 400 is formed by stacking the positive electrode 450, the separator 470a, the negative electrode 460, and the separator 470b in this order, and by winding the stacked body so as to have an elongated circular shape in cross section.

The positive electrode 450 is an electrode plate formed by forming a positive active material layer on a surface of a positive electrode substrate layer which is a metal foil having an elongated strip shape and made of aluminum, an aluminum alloy or the like. As a positive active material for forming the positive active material layer, a known material can be suitably used provided that the material is a positive active material capable of occluding and discharging lithium ions. For example, as the positive active material, a poly-anion compound such as $LiMPO_4$, $LiMSiO_4$, $LiMBO_3$ (M being one kind or two or more kinds of transition metal elements selected from a group consisting of Fe, Ni, Mn, Co and the like), a spinel compound such as lithium titanate or lithium manganate, lithium transition metal oxide such as $LiMO_2$ (M being one kind or two or more kinds of transition metal elements selected from a group consisting of Fe, Ni, Mn, Co and the like) or the like can be used.

The negative electrode 460 is an electrode plate formed by forming a negative active material layer on a surface of a negative electrode substrate layer which is a metal foil having an elongated strip shape and made of copper, a copper alloy or the like. As a negative active material for forming the negative active material layer, a known material can be suitably used provided that the material is a negative active material capable of occluding and discharging lithium ions. For example, as the negative active material, besides lithium metal and a lithium alloy (lithium-aluminum, lithium-lead, lithium-tin, lithium-aluminum-tin, lithium-gallium, and a lithium metal containing alloy such as Wood's alloy), an alloy which can occlude or discharge lithium ions, a carbon material (for example, graphite, hardly graphitizable carbon, easily graphitizable carbon, low-temperature sintered carbon, amorphous carbon or the like), metal oxide, lithium metal oxide ($Li_4Ti_5O_{12}$ or the like), a polyphosphoric acid compound and the like can be named.

The separators 470a, 470b are respectively formed of a resin-made microporous sheet. As a raw material for forming the separators 470a, 470b used for the energy storage device 10, a known material can be suitably used provided that performance of the energy storage device 10 is not impaired.

The positive electrode 450 has a plurality of tabs 411 which protrude outward on one end thereof in a winding axis direction. In the same manner as the positive electrode 450, the negative electrode 460 also has a plurality of tabs 421 which protrude outward on one end thereof in the winding axis direction. These plurality of tabs 411 and the plurality of tabs 421 are portions where an active material is not applied by coating and the substrate layer is exposed (active material non-coated portions).

The winding axis is an imaginary axis which becomes a center axis at the time of winding the positive electrode 450, the negative electrode 460 and the like. In this embodiment, the winding axis is a straight line passing the center of the electrode assembly 400 and parallel to the Z axis direction.

The plurality of tabs 411 and the plurality of tabs 421 are disposed on an end on the same side in the winding axis direction (an end on a plus side in the Z axis direction in FIG. 3), and are respectively stacked to each other at predetermined positions of the electrode assembly 400 by stacking the positive electrode 450 and the negative electrode 460 respectively. To be more specific, the plurality of tabs 411 are stacked to each other on one end in the winding axis direction at a predetermined position in a circumferential direction due to stacking of the positive electrode 450 by winding. On the other hand, the plurality of tabs 421 are stacked to each other on one end in the winding axis direction at a predetermined position in the circumferential direction different from the position where the plurality of tabs 411 are stacked to each other due to stacking of the negative electrode 460 by winding.

As a result, on the electrode assembly 400, the tab bundle 410 formed by stacking the plurality of tabs 411 and the tab bundle 420 formed by stacking the plurality of tabs 421 are formed. The tab bundle 410 is gathered toward the center in the stacking direction, for example, and is bonded to the positive electrode current collector by ultrasonic welding, for example. On the other hand, the tab bundle 420 is gathered toward the center in the stacking direction, for example, and is bonded to the negative electrode current collector by ultrasonic welding, for example.

The tab bundles (410, 420) are portions for introducing and discharging electricity in the electrode assembly 400. The tab bundles (410, 420) may be also referred by other names such as "leads (lead portions)" or "current collecting portions".

In this embodiment, the tab bundle 410 is formed by stacking the tabs 411 where the substrate layer is exposed and hence, the tab bundle 410 forms a portion which does not contribute to power generation. In the same manner, the tab bundle 420 is formed by stacking the tabs 421 where the substrate layer is exposed and hence, the tab bundle 420 forms a portion which does not contribute to power generation. On the other hand, a portion of the electrode assembly 400 which differs from the tab bundles 410, 420 is formed by stacking a portion where an active material is applied by coating to the substrate layer and hence, the portion forms a portion which contributes to power generation. Hereinafter, the portion is referred to as a body portion 430. Both end portions of the body portion 430 in the X axis direction respectively form curved portions 431, 432 each having a curved outer peripheral surface. Further, a portion of the electrode assembly 400 between the curved portions 431, 432 forms a flat portion 433 having flat external side surfaces. In this manner, the electrode assembly 400 is formed into an elongated circular shape where the flat portion 433 is disposed between two curved portions 431, 432.

Next, the specific configuration of the side spacer 700 is described. In this embodiment, although the side spacer 700 on a negative electrode side is exemplified, the side spacer 700 on a positive electrode side also has substantially the same configuration and hence, the description with respect to the side spacer 700 on a positive electrode side is omitted.

Figure 4:
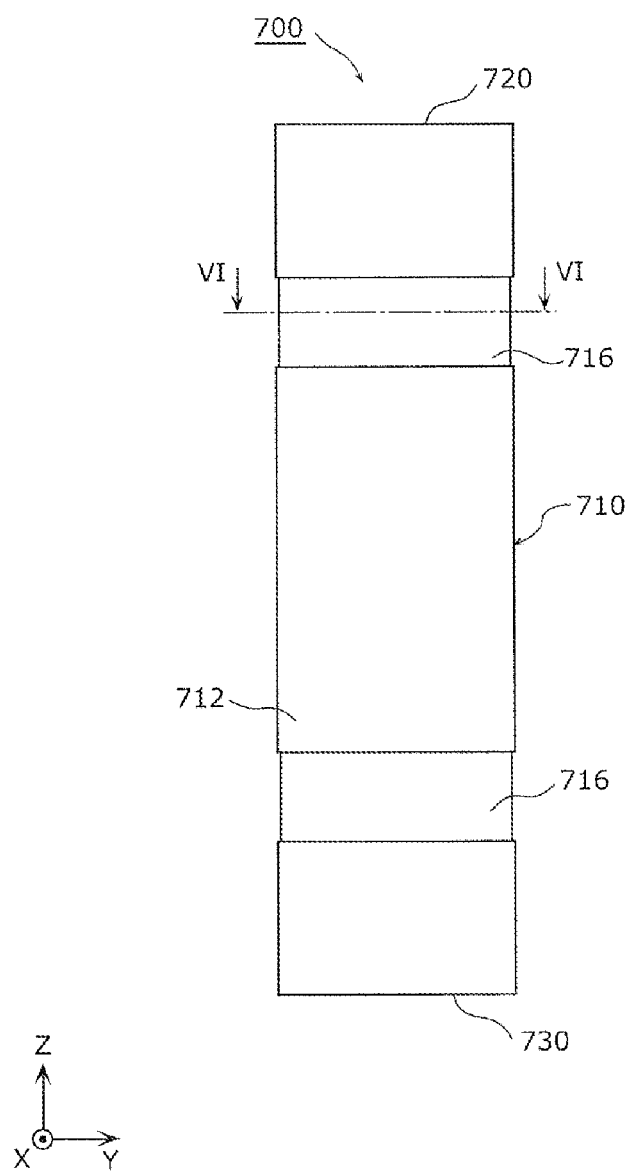
FIG. 4 is a front view of a side spacer according to the embodiment as viewed from the outside.
Figure 5:
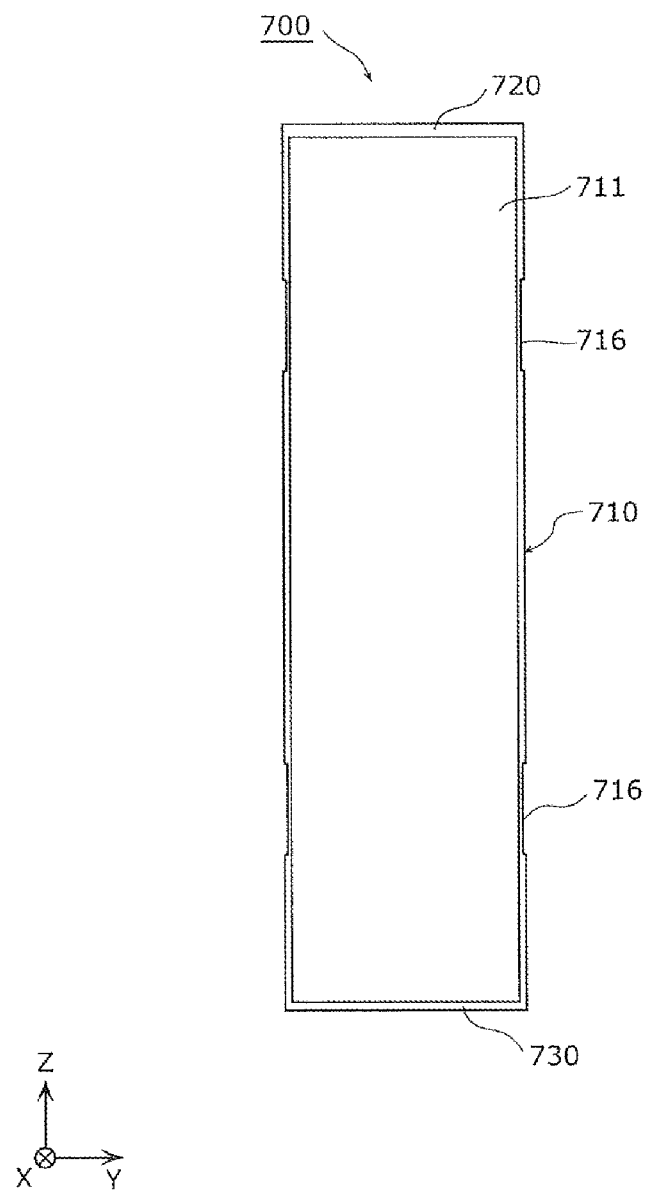
FIG. 5 is a back view of the side spacer according to the embodiment as viewed from the inside.
Figure 6:
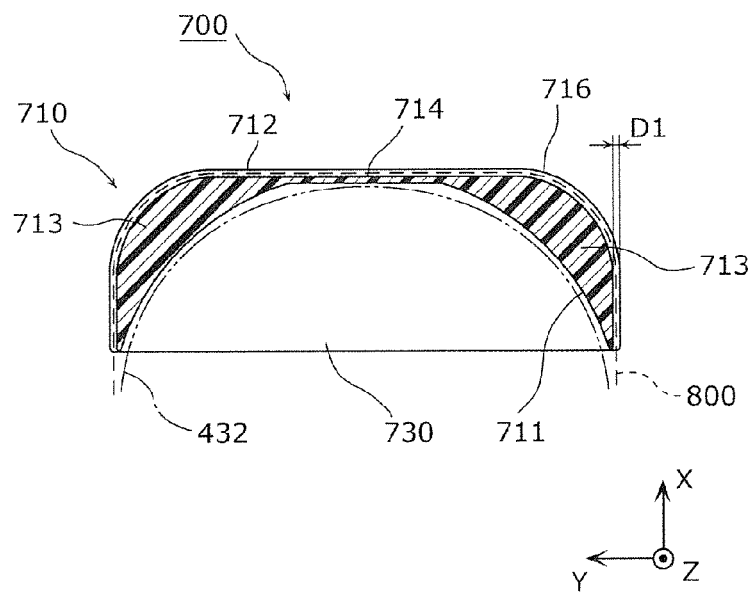
FIG. 6 is a cross-sectional view of the side spacer according to the embodiment as viewed from an X-Y plane including a line VI-VI in FIG. 4.

FIG. 4 is a front view of the side spacer 700 according to the embodiment as viewed from the outside. FIG. 5 is a back view of the side spacer 700 according to the embodiment as viewed from the inside. FIG. 6 is a cross-sectional view of the side spacer 700 according to the embodiment as viewed from an X-Y plane including cutting line VI-VI in FIG. 4. In FIG. 6, a broken line indicates a tape member 800, and a double-dashed chain line indicates the curved portion 432 of the electrode assembly 400.

As shown in FIG. 4 to FIG. 6, the side spacer 700 is an elongated member extending in the insertion direction (Z axis direction), and is formed using a raw material having an insulation property such as PC, PP, PE, or PPS. The side spacers 700 are disposed so as to oppositely face a pair of short side surfaces out of an inner side surface of the body 111 of the case 100.

The side spacer 700 is an integral body which is continuously brought into contact with, over the entire length of, one side portion of the electrode assembly 400 extending in the direction that the electrode assembly 400 is inserted into the case 100 (Z axis direction). In this embodiment, one side portion of the electrode assembly 400 is a side portion which opposedly faces the short side surface of the body 111 of the case 100.

To be more specific, the side spacer 700 is an integral body formed of a wall portion 710; a ceiling plate 720 which is connected to an upper end portion of the wall portion 710; and a bottom plate 730 which is connected to a lower end portion of the wall portion 710.

The wall portion 710 is a portion which extends in the insertion direction and covers one side portion of the electrode assembly 400. To be more specific, as shown in FIG. 6, an inner side surface 711 of the wall portion 710 on an inner side of the case 100 is a surface which opposedly faces the curved portion 432 of the electrode assembly 400, and forms a smooth curved surface corresponding to the curved portion 432. When the side spacer 700 is assembled to the electrode assembly 400, the inner side surface 711 of the wall portion 710 is brought into contact with the curved portion 432 of the electrode assembly 400.

An external side surface 712 of the wall portion 710 on a case 100 side is configured such that a pair of corner portions of the external side surface 712 is formed into a round shape corresponding to an internal shape of the case 100. The pair of round-shaped portions opposedly faces a pair of neighboring corner portions in the rectangular-shaped case 100. In the wall portion 710, assume the pair of round-shaped portions as corner portion regions 713, and assume a portion of the wall portion 710 which is sandwiched between the pair of corner portion regions 713 and is disposed adjacently to the pair of corner portion regions 713 as a center region 714. The center region 714 is a region which covers a top portion of the curved portion 432 of the electrode assembly 400, and the corner portion regions 713 are regions which cover side portions of the top portion of the curved portion 432.

As shown in FIG. 4 to FIG. 6, a recessed portion 716 which is uniformly continued in the circumferential direction is formed on the external side surface 712 of the wall portion 710 over the entire length of the external side surface 712. The recessed portion 716 is formed at two portions of the external side surface 712, that is, an upper portion and a lower portion of the external side surface 712. The tape member 800 for fixing the electrode assembly 400 and the side spacer 700 to each other is brought into contact with the recessed portions 716 respectively.

Figure 7:
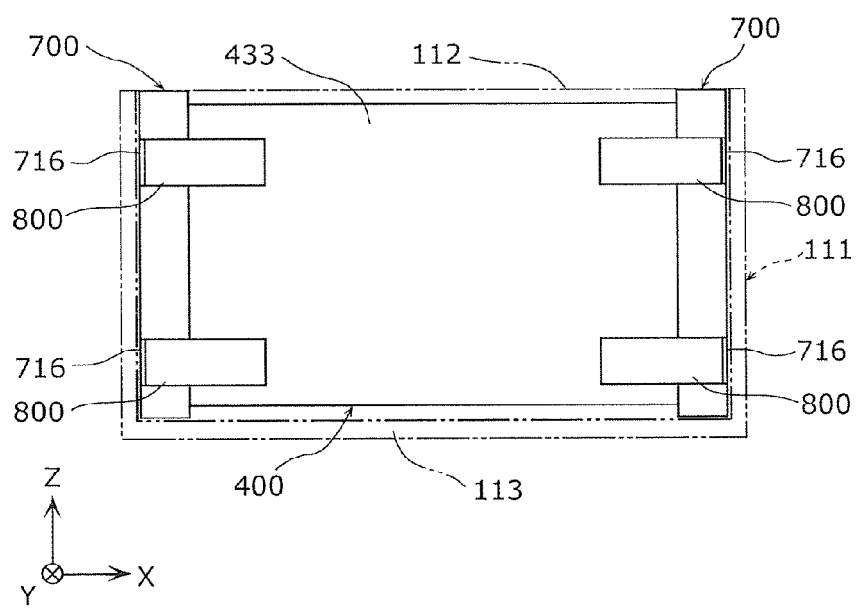
FIG. 7 is a side view schematically showing a state where the electrode assembly and the side spacer according to the embodiment are fixed to each other by a tape member.

FIG. 7 is a side view schematically showing a state where the electrode assembly 400 and the side spacers 700 according to the embodiment are fixed to each other using the tape members 800. In FIG. 7, a double-dashed chain line indicates the body 111 of the case 100. As shown in FIG. 7, the side spacers 700 and the electrode assembly 400 are directly fixed to each other by the tape members 800. That is, after the side spacers 700 and the electrode assembly 400 are fixed to each other, no other member is interposed between the side spacers 700 and the electrode assembly 400.

The tape member 800 is a flexible sheet having an elongated rectangular shape, and one surface of the tape member 800 is formed of an adhesive surface having adhesiveness. As shown in FIG. 6 and FIG. 7, the adhesive surface of the tape member 800 is adhered to the flat portion 433 of the electrode assembly 400 and the recessed portion 716 of the side spacer 700 and hence, the electrode assembly 400 and the side spacer 700 are fixed to each other. To be more specific, both end portions of the tape member 800 are adhered to the flat portion 433 of the electrode assembly 400, and the remaining portion of the tape member 800 is adhered to the recessed portion 716 of the side spacer 700. With respect to the tape member 800, one tape member 800 is provided to each of the respective recessed portions 716. That is, a plurality of the tape members 800 are provided to one side spacer 700.

The recessed portion 716 has a shape corresponding to a portion of the tape member 800 which is brought into contact with the side spacer 700. That is, it is sufficient to form only a region of the side spacer 700 where the tape member 800 overlaps with the side spacer 700 into the recessed portion 716. For example, when the tape member 800 is an elongated rectangular sheet, the recessed portion 716 developed in plane has a rectangular shape in the same manner as the tape member 800. A depth D1 of the recessed portion 716 is set greater than a thickness of the tape member 800. With such a configuration, the tape member 800 adhered to the recessed portion 716 of the side spacer 700 is accommodated in the recessed portion 716. That is, it is possible to prevent the tape member 800 from protruding from the outer peripheral surface of the side spacer 700.

The ceiling plate 720 and the bottom plate 730 are respectively formed of a plate body where a pair of neighboring corner portions is formed into a round shape. The ceiling plate 720 is a portion which is connected to the upper end portion (one end portion) of the wall portion 710 and covers one end portion of the electrode assembly 400 on an opening 112 side from above. The bottom plate 730 is a portion which is connected to the lower end portion (the other end portion) of the wall portion 710 and covers the other end portion of the electrode assembly 400 from below.

Next, a manufacturing method of the energy storage device 10 is described.

Firstly, in an electrode assembly forming step, the positive electrode 450, the negative electrode 460, and the separators 470a, 470b are alternately stacked and wound thus forming the electrode assembly 400 shown in FIG. 3.

When the winding is completed, an adhesive tape (not shown in the drawing) is adhered to the flat portion 433 of the electrode assembly 400 so as to prevent the electrode assembly 400 from being brought into a developed state.

Next, the tab bundle 420 of the electrode assembly 400 is fixed to the negative electrode current collector by welding, and the tab bundle 410 of the electrode assembly 400 is fixed to the positive electrode current collector by welding.

Next, the side spacers 700 are mounted on the body portion 430 of the electrode assembly 400. To be more specific, the side spacers 700 are mounted on the curved portions 431, 432 of the body portion 430 individually. Then, the tape members 800 are adhered to the respective recessed portions 716 of the side spacers 700 and the flat portion 433 of the body portion 430 so that the side spacers 700 are fixed to the body portion 430. At this stage of the operation, an operator can adhere the tape members 800 using the recessed portions 716 as marks.

Next, the electrode assembly 400 and the side spacers 700 which are formed as an integral body are accommodated in the case 100 by inserting the integral body into the case 100 from the opening 112 of the body 111 of the case 100. In this case, the tape members 800 do not protrude from the recessed portions 716 of the side spacers 700 and hence, there is no possibility that the tape members 800 interfere with the body 111 of the case 100. Accordingly, the electrode assembly 400 and the side spacers 700 can be smoothly pushed into the body 111.

Next, the lid body 110 is connected by welding to the body 111 thus assembling the case 100, and an electrolyte solution is filled in the body 111 from the electrolyte solution filling port. Then, the electrolyte solution filling port is closed by welding an electrolyte solution filling plug to the lid body 110 so that the energy storage device 10 is manufactured.

As has been described above, according to this embodiment, the portions of the side spacer 700 with which the tape members 800 are brought into contact are wholly formed as the recessed portions 716 and hence, the tape members 800 are caught by the recessed portions 716. Accordingly, it is possible to suppress the displacement of the tape members 800 from the side spacers 700, and the positional displacement between the electrode assembly 400 and the side spacers 700 can be also suppressed. With such a configuration, it is possible to suppress the lowering of the electrode assembly 400 from a predetermined position due to its own weight.

The portions of the side spacer 700 with which the tape members 800 are brought into contact are wholly formed as the recessed portions 716 and hence, a protrusion amount of the whole tape member 800 with respect to the side spacer 700 can be suppressed. Accordingly, a mounting space for the electrode assembly 400 in the case 100 can be increased, and a capacity of the energy storage device 10 can be increased by increasing an outer size of the electrode assembly 400 without increasing a size of the energy storage device 10 as a whole.

With such a configuration, the positional displacement of the electrode assembly 400 can be suppressed, and a mounting space for the electrode assembly 400 in the case 100 can be ensured.

In the case 100, a portion where the electrode assembly 400 and the side spacer 700 overlap with each other has a largest thickness. That is, the electrode assembly 400 and the side spacer 700 are brought into a dense state in the case 100. The recessed portions 716 are formed on the side spacer 700 which forms a portion of the large thickness portion, and the tape members 800 are brought into contact with the inside of the recessed portions 716 and hence, the tape members 800 are less likely to be peeled off from the side spacer 700 in the case 100.

Further, when the tape members 800 are brought into contact with the side spacer 700, such an operation can be performed using the recessed portions 716 as marks and hence, mounting operability can be enhanced.

By suppressing a protrusion amount of the whole tape member 800 with respect to the side spacer 700, at the time of inserting the electrode assembly 400 and the side spacers 700 into the case 100, it is also possible to suppress the interference of the tape member 800 with the case 100. Accordingly, the tape member 800 is less likely to be peeled off from the side spacer 700 at the time of inserting the electrode assembly 400 and the side spacers 700 into the case 100.

Further, the plurality of tape members 800 are provided to one side spacer 700 and hence, it is possible to suppress the removal of the tape members 800 from the side spacer 700. Further, the side spacer 700 has a plurality of portions (recessed portions 716) by which the tape members 800 are caught and hence, it is possible to suppress the lowering of the electrode assembly 400 from a predetermined position due to its own weight with more certainty.

The strip-like member is formed of the tape member 800 and hence, the side spacer 700 and the electrode assembly 400 can be easily fixed to each other. Further, even when the tape member 800 is peeled off from the side spacer 700, the tape member 800 can be caught by the recessed portion 716.

The recessed portion 716 is formed into a shape which corresponds to a portion of the tape member 800 which is brought into contact with the side spacer 700 and hence, the tape member 800 can be fitted in the recessed portion 716. Accordingly, the positional displacement of the tape member 800 is less likely to occur.

The side spacer 700 which is an integral body is continuously brought into contact with, over the entire length of, one side portion of the electrode assembly 400 and hence, the side spacer 700 protects the electrode assembly 400 from a point of time that the insertion of the electrode assembly 400 into the case 100 is started to a point of time that the insertion of the electrode assembly 400 into the case 100 is finished. Accordingly, a force which acts on the electrode assembly 400 at the time of insertion can be decreased thus enhancing durability of the electrode assembly 400.

The side spacer 700 is continuously brought into contact with, over the entire length of, one side portion of the electrode assembly 400 and hence, a close contact state between the side spacer 700 and the electrode assembly 400 can be enhanced whereby the positional displacement between the electrode assembly 400 and the side spacer 700 can be further suppressed.

The side spacer 700 is directly fixed to the electrode assembly 400 and hence, no other member is interposed between the side spacer 700 and the electrode assembly 400. That is, a close contact state between the side spacer 700 and the electrode assembly 400 can be enhanced and hence, the positional displacement between the electrode assembly 400 and the side spacer 700 can be further suppressed.

Modification 1

In the above-mentioned embodiment, the description has been made by exemplifying the side spacer 700 having the ceiling plate 720 and the bottom plate 730. In this modification 1, a side spacer 700A having no bottom plate 730 is described.

Figure 8:
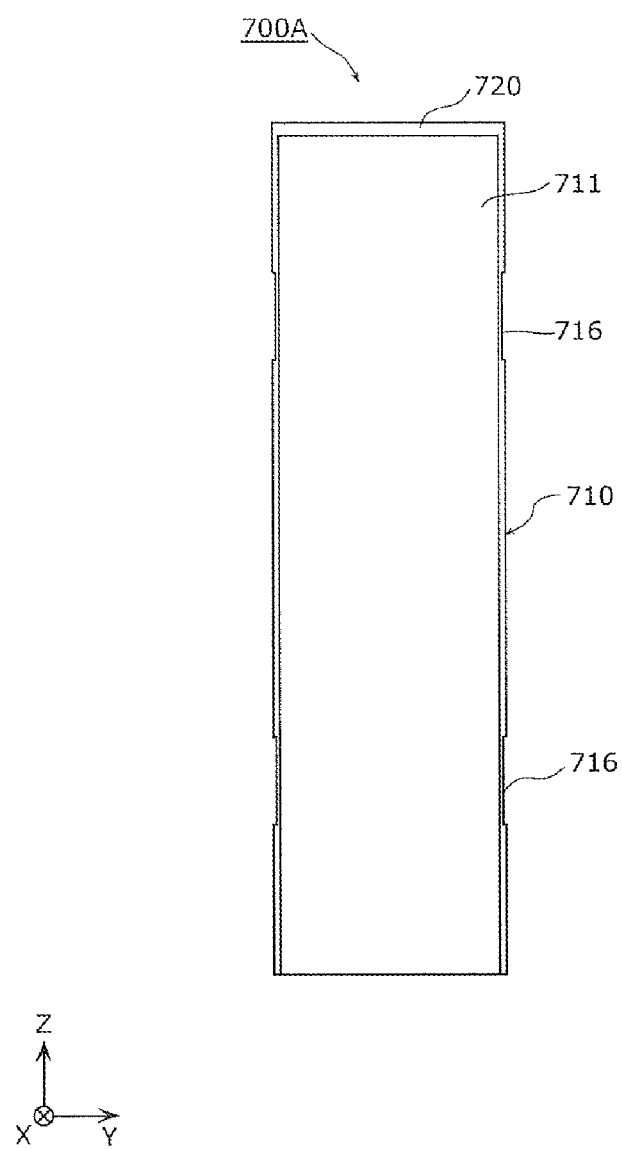
FIG. 8 is a back view of a side spacer according to a modification 1 as viewed from the inside.

FIG. 8 is a back view of the side spacer 700A according to the modification 1 as viewed from the inside. To be more specific, FIG. 8 is a view corresponding to FIG. 5. As shown in FIG. 8, the side spacer 700A is substantially equal to the above-mentioned side spacer 700 except that the bottom plate 730 is eliminated. In this case, in a state where the side spacer 700A is fixed to the electrode assembly 400, it is desirable that a lower end portion of a wall portion 710 of the side spacer 700A protrude downward from a lower end surface of the electrode assembly 400. With such a configuration, in a state where the lower end portion of the wall portion 710 is brought into contact with the case 100, it is possible to prevent the interference between the electrode assembly 400 and the case 100. That is, it becomes unnecessary to provide a buffer member such as a cushion sheet between the lower end surface of the electrode assembly 400 and the case 100. An insulation sheet having no buffer property may be disposed between the electrode assembly 400 and the case 100.

Provided that the side spacer 700A can ensure predetermined rigidity or more, not only the bottom plate 730 but also the ceiling plate 720 can be eliminated.

Modification 2

In the above-mentioned embodiment, the configuration is exemplified where the side spacer 700 is mounted on the winding-type electrode assembly 400. However, the side spacer 700 is also applicable to an electrode assembly other than the winding-type electrode assembly. In this modification 2, the description is made with respect to the case where the side spacer 700 is applied to a stacking-type electrode assembly 400*b*.

Figure 9:
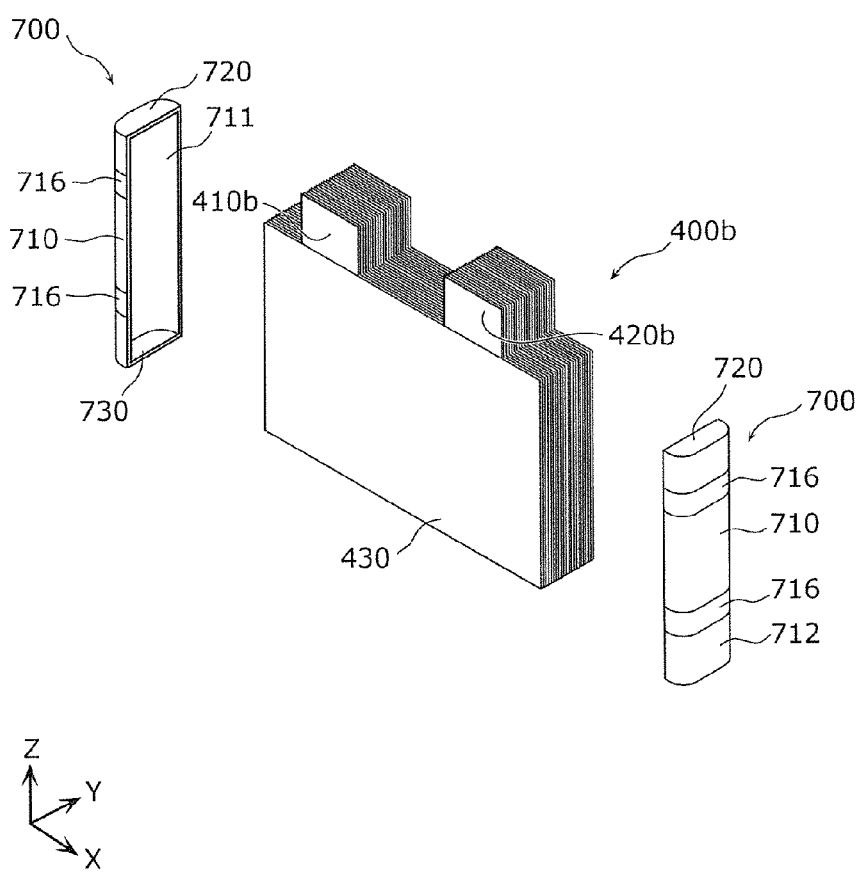
FIG. 9 is an exploded perspective view showing an electrode assembly and a side spacer according to a modification 2.

FIG. 9 is an exploded perspective view showing an electrode assembly and side spacers according to the modification 2. As shown in FIG. 9, the electrode assembly 400*b* is a stacking-type energy storage element (power generating element) which includes positive electrode plates, negative electrode plates, and separators, and can store electricity. To be more specific, the electrode assembly 400*b* is formed by stacking the positive electrode plates, the negative electrode plates and the separators in layers such that the separator is sandwiched between the positive electrode plate and the negative electrode plate. With such a configuration, in the electrode assembly 400*b*, a tab bundle 410*b* of the positive electrode plates is formed by stacking the positive electrode plates to each other, and a tab bundle 420*b* of the negative electrode plates is formed by stacking the negative electrode plates to each other. The pair of side spacers 700 is mounted on both side portions of the stacking-type electrode assembly 400*b*.

In the modification 2, the side spacers 700 of the above-mentioned embodiment are applied to the stacking-type electrode assembly 400*b* without modifying the side spacers 700. However, side spacers which corresponding to the shape of the electrode assembly 400*b* may be adopted. To be more specific, by forming an internal space which the side spacer defines (a space which is defined by a wall portion, a ceiling plate, and a bottom plate of the side spacer) into a rectangular parallelepiped shape, side portions of the electrode assembly 400 can be accommodated in the side spacers without deforming side portions of the electrode assembly 400.

Other Embodiments

The energy storage device according to the present invention has been described heretofore with reference to the embodiment. However, the present invention is not limited to the above-mentioned embodiment. The configurations which are obtained by applying various modifications which those who are skilled in the art conceive to the above-mentioned embodiment or the configurations obtained by combining the above-described plurality of constitutional elements are also included in the scope of the present invention without departing from the gist of the present invention.

In the description made hereinafter, parts identical with the parts of the above-mentioned embodiment are given the same symbols and their description may be omitted.

For example, the number of electrode assemblies 400 which the energy storage device 10 includes is not limited to one, and the energy storage device 10 may include two or more electrode assemblies 400. When the energy storage device 10 includes the plurality of electrode assemblies 400, it is sufficient that a pair of side spacers 700 be mounted on each electrode assembly 400.

The positional relationship between the positive electrode side tab bundle 410 and the negative electrode side tab bundle 420 which the electrode assembly 400 has is not particularly limited. For example, in the winding-type electrode assembly 400, the tab bundle 410 and the tab bundle 420 may be disposed on sides opposite to each other with respect to the winding axis direction. In the case where the energy storage device 10 includes the stacking-type electrode assembly, the positive electrode side tab bundle and the negative electrode side tab bundle may be disposed so as to protrude in directions different from each other as viewed in the stacking direction. In this case, it is sufficient that lower insulating members, current collectors and the like be disposed at positions which respectively correspond to the positive electrode side tab bundle and the negative electrode side tab bundle.

In the above-mentioned embodiment, the case has been exemplified where the side spacer 700 is an integral body which is continuously brought into contact with one side portion of the electrode assembly 400 extending in the Z axis direction over the entire length of the one side portion. However, the side spacer may be a split-type spacer where the spacer is split into parts in the Z axis direction.

In the above-mentioned embodiment, as the spacer, the side spacer 700 which covers the side of the electrode assembly 400 is exemplified. However, as the spacer, any type of spacer may be adopted provided that the spacer is interposed between the case and the electrode assembly. As other spacers, for example, an upper spacer which is interposed between an upper surface of the electrode assembly and the lid body of the case, a lower spacer which is interposed between a lower surface of the electrode assembly and the bottom of the case and the like can be named.

In the above-mentioned embodiment, the tape member 800 is exemplified as the strip-like member. However, as the strip-like member, any type of strip-like member may be adopted provided that the strip-like member can fix the spacer and the electrode assembly to each other. As other strip-like members, for example, a belt which can fix the spacer and the electrode assembly by confining the spacer and the electrode assembly to each other can be named.

INDUSTRIAL APPLICABILITY

The present invention is applicable to an energy storage device and the like such as a lithium ion secondary battery.

DESCRIPTION OF REFERENCE SIGNS

10: energy storage device
100: case
400, 400*b*: electrode assembly
700, 700A: side spacer (spacer)
716: recessed portion
800: tape member (strip-like member)

The invention claimed is:

1. An energy storage device, comprising:
an electrode assembly;
a case for accommodating the electrode assembly;
a spacer interposed between the ease and the electrode assembly; and
a strip-like member being brought into contact with each of the spacer and the electrode assembly and fixing the spacer and the electrode assembly to each other,
wherein a portion of the spacer with which the strip-like member is brought into contact is wholly formed of a recessed portion,
wherein the electrode assembly has a rectangular shape that includes a short-side surface and a long-side surface extending longer than the short-side surface, and
wherein the strip-like member is brought into contact with the long-side surface of the electrode assembly.

2. The energy storage device according to claim 1, wherein a plurality of the strip-like members are provided, and
wherein a plurality of the recessed portions are formed on the spacer corresponding to the plurality of the strip-like members.

3. The energy storage device according to claim 1, wherein the strip-like member comprises a tape member having adhesiveness.

4. The energy storage device according to claim 1, wherein the recessed portion has a shape corresponding to a portion of the strip-like member which is brought into contact with the spacer.

5. The energy storage device according to claim 1, wherein the spacer comprises an integral body which is continuously brought into contact with, over an entire length of, one side portion of the electrode assembly extending in a direction that the electrode assembly is inserted into the case.

6. The energy storage device according to claim 1, wherein the spacer is directly fixed to the electrode assembly.

7. The energy storage device according to claim 1, wherein the long-side surface of the electrode assembly includes a flat surface, the strip-like member attaching to the flat surface of the long-side surface of the electrode assembly.

8. The energy storage device according to claim 1, wherein the long-side surface of the electrode assembly includes a flat surface, the strip-like member directly contacting the flat surface of the long-side surface of the electrode assembly.

9. The energy storage device according to claim 1, wherein the recessed portion is sandwiched between the strip-like member and the short-side surface of the electrode assembly.

10. The energy storage device according to claim 1, wherein the electrode assembly includes a second long-side surface extending longer than the short-side surface,
wherein an end portion of the strip-like member is adhered to the long-side surface of the electrode assembly, and a second end portion of the strip-like member is adhered to the second long-side surface of the electrode assembly,
wherein the second long-side surface is opposite to the long-side surface, and
wherein the second end portion is located at an opposite side of the strip-like member from the end portion.

11. The energy storage device according to claim 10, wherein the spacer is attached to the short-side surface of the electrode assembly in a direction orthogonal to a direction that the long-side surface of the electrode assembly faces the second long-side surface of the electrode assembly.

12. An energy storage device, comprising:
an electrode assembly;
a case for accommodating the electrode assembly;
a spacer interposed between the case and the electrode assembly; and
a ship-like member being brought into contact with each of the spacer and the electrode assembly and fixing the spacer and the electrode assembly to each other,
wherein a portion of the spacer with which the strip-like member is brought into contact is wholly formed of a recessed portion, and
wherein the spacer, which is formed of the recessed portion, is attached to a side portion of the electrode assembly in a direction orthogonal to a stacking direction of electrode plates of the electrode assembly.

13. The energy storage device according to claim 12, wherein the electrode assembly has a rectangular shape that includes a short-side surface and a long-side surface extending longer than the short-side surface.

14. The energy storage device according to claim 13, wherein the long-side surface of the electrode assembly longitudinally extends in the direction orthogonal to a stacking direction of the electrode assembly.

15. The energy storage device according to claim 13, wherein the long-side surface of the electrode assembly includes a flat surface, the strip-like member attaching to the flat surface of the long-side surface of the electrode assembly.

16. The energy storage device according to claim 13, wherein the long-side surface of the electrode assembly includes a flat surface, the strip-like member directly contacting the flat surface of the long-side surface of the electrode assembly.

17. The energy storage device according to claim 13, wherein the electrode assembly includes a second long-side surface extending longer than the short-side surface,
wherein an end portion of the strip-like member is adhered to the long-side surface of the electrode assembly, and a second end portion of the strip-like member is adhered to the second long-side surface of the electrode assembly,
wherein the second long-side surface is opposite to the long-side surface, and
wherein the second end portion is located at an opposite side of the strip-like member from the end portion.

18. The energy storage device according to claim 13, wherein the electrode assembly includes a second long-side surface extending longer than the short-side surface,
wherein the stacking direction of the electrode assembly includes a direction that the long-side surface of the electrode assembly faces the second long-side surface of the electrode assembly, and
wherein the second long-side surface is opposite to the long-side surface.

19. An energy storage device, comprising:
an electrode assembly including electrode layers stacked between a first surface of the electrode assembly and a second surface of the electrode assembly;
a case for accommodating the electrode assembly;
a spacer interposed between the case and the electrode assembly; and
a connecting member connecting the spacer and the electrode assembly to each other,
wherein the spacer includes a recessed portion in which the connecting member passes through to contact the first surface of the electrode assembly and the second surface of the electrode assembly, and
wherein a first end of the connecting member contacts the first surface of the electrode assembly and a second end, opposite to the first end, of the connecting member contacts the second surface of the electrode assembly.

20. The energy storage device according to claim 19, wherein each of the first surface of the electrode assembly and the second surface of the electrode assembly includes a flat surface on which the connecting member is attached, and
wherein the electrode assembly includes a third surface extending shorter than the first surface of the electrode assembly and the second surface of the electrode assembly, the recessed portion being sandwiched between the connecting member and the third surface of the electrode assembly.

* * * * *